United States Patent
Tsai et al.

(10) Patent No.: US 8,082,558 B2
(45) Date of Patent: Dec. 20, 2011

(54) SLOT-IN OPTICAL DISK DRIVE FOR LOADING/UNLOADING AN OPTICAL DISK

(75) Inventors: Yao-Ching Tsai, Taoyuan County (TW); Jen-Chen Wu, Taoyuan County (TW)

(73) Assignee: Quanta Storage Inc., Guishan Shiang, Taoyuan County (TW)

( * ) Notice: Subject to any disclaimer, the term of this patent is extended or adjusted under 35 U.S.C. 154(b) by 106 days.

(21) Appl. No.: 12/731,139

(22) Filed: Mar. 24, 2010

(65) Prior Publication Data
US 2010/0281494 A1 Nov. 4, 2010

(30) Foreign Application Priority Data
May 4, 2009 (TW) .............................. 98114883 A (51) Int. Cl.
*G11B 17/04* (2006.01)
(52) U.S. Cl. ...................................... 720/623; 720/704
(58) Field of Classification Search .......... 720/619–623, 720/703, 704
See application file for complete search history.

(56) References Cited

U.S. PATENT DOCUMENTS

| 7,356,825 | B2 * | 4/2008 | Makisaka et al. | 720/626 |
|---|---|---|---|---|
| 7,937,719 | B2 * | 5/2011 | Akama et al. | 720/623 |
| 2005/0086673 | A1 * | 4/2005 | Ueno et al. | 720/622 |
| 2006/0143630 | A1 * | 6/2006 | Yamanaka et al. | 720/619 |
| 2007/0011697 | A1 * | 1/2007 | Kido | 720/713 |
| 2008/0282274 | A1 * | 11/2008 | Handa et al. | 720/622 |
| 2008/0320505 | A1 * | 12/2008 | Tu et al. | 720/619 |
| 2009/0049462 | A1 * | 2/2009 | Sato | 720/622 |
| 2009/0300665 | A1 * | 12/2009 | Akama et al. | 720/620 |
| 2010/0122272 | A1 * | 5/2010 | Fujii | 720/620 |

* cited by examiner

*Primary Examiner* — Brian Miller
(74) *Attorney, Agent, or Firm* — Winston Hsu; Scott Margo (57) ABSTRACT

A slot-in optical disk drive includes a power unit to drive a sliding component to rotate a loading bar, so as to process loading procedure of the slot-in optical disk drive. A base covers on a main board disposed on a rear side of a casing of the slot-in optical disk drive. A first linking bar is pivoted to a center of the base. An end of the first linking bar is driven by the sliding component, and a haul slot is for driving a right positioning bar. The other end of the first linking bar is pivoted to a second linking bar of the base. The second linking bar is for driving the unloading bar pivoted to the base. The end of the unloading bar is close to a lateral side of the casing, so as to keep away from a breach on the base.

12 Claims, 7 Drawing Sheets

SLOT-IN OPTICAL DISK DRIVE FOR LOADING/UNLOADING AN OPTICAL DISK

BACKGROUND OF THE INVENTION

1. Field of the Invention

The present invention relates to an optical disk drive for reading and writing data of an optical disk, and more particularly, to a slot-in disk drive for loading/unloading the optical disk.

2. Description of the Prior Art

Generally, a conventional optical disk drive includes a tray type one and a slot-in type one. The conventional tray optical disk drive utilizes a tray to hold an optical disk, and the tray moves in/out the optical disk drive to load/unload the optical disk. On the other hand, the conventional slot-in optical disk drive can load/unload the optical disk automatically by a loading/unloading mechanism as putting the optical disk into an opening of the optical disk drive, and then the loading/unloading mechanism positions the optical disk at a predetermined location. The conventional slot-in optical disk drive can be operated conveniently and has thin structure, so as to be acceptable to the developing trend of the notebook computer industry.

Figure 1:
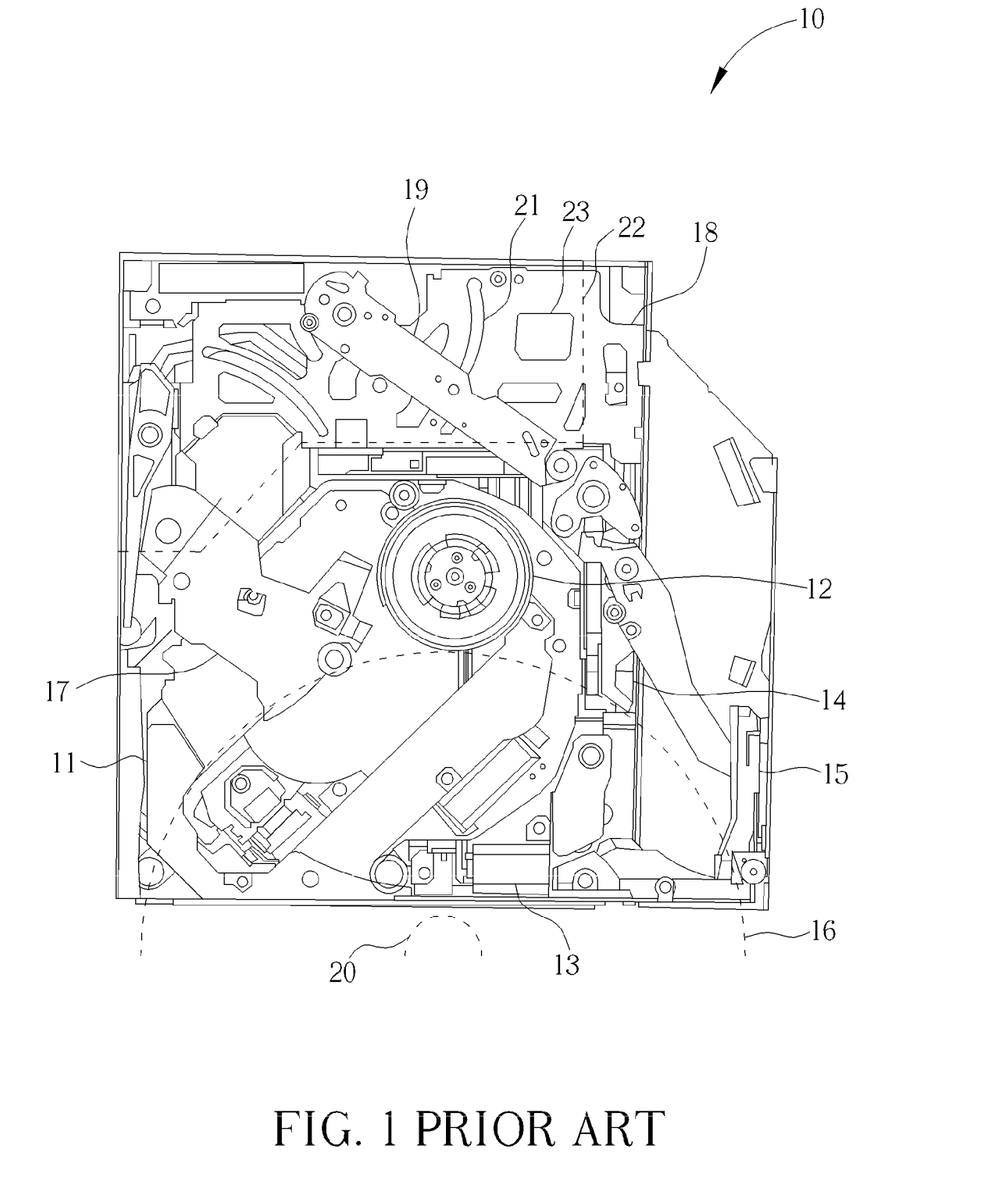
FIG. 1 is a top view of a slot-in optical disk drive in the prior art.

Please refer to FIG. 1. FIG. 1 is a top view of a slot-in optical disk drive 10 disclosed in Taiwan patent publication no. 200805260 in the prior art. A traverse 11 is disposed inside a hollow space of the slot-in disk drive 10. A spindle motor 12 disposed on an end of the traverse 11 is located at a center of the slot-in optical disk drive 10. A power unit 13 is disposed adjacent to an opening and the traverse 11 of the slot-in optical disk drive 10 for driving a sliding component 14 to move forward and backward. A loading unit 15 driven by the sliding component 14 is disposed on a side of the slot-in optical disk drive 10 adjacent to the opening for pushing an optical disk 16. An unloading unit 17 driven by the sliding component 14 is disposed on a base 18 and adjacent to a lateral side of the slot-in optical disk drive 10 for ejecting the optical disk 16. A positioning unit 19 is disposed on a central rear end of the slot-in optical disk drive 10 for pushing the optical disk 16 with the unloading unit 17. When loading the optical disk 16, two edges of the optical disk 16 guides a central hole 20 of the optical disk 16 to align with the spindle motor 12 for engagement.

Because the base 18 covers the rear end of the slot-in optical disk drive 10, a guiding slot 21 is formed on the base 18 for guiding the unloading unit 17 and the positioning unit 19. A main board 22 of the slot-in optical disk drive 10, as shown in a dotted line, is disposed under the base 18 and covered by the base 18. There are a plurality of holes 23 formed on the base 18 for testing or overhauling the main board 22 after assembling the slot-in optical disk drive 10.

However, when the loading unit 15 pushes the optical disk 16, the optical disk 16 closes to the unloading unit 17 so that the optical disk 16 between the unloading unit 17 and the positioning unit 19 is unbalanced in force distribution, which causes the central hole 20 of the optical disk 16 not to align with the spindle motor 12. In addition, links of the unloading unit 17 and the positioning unit 19 move above the base 18, and accordingly the holes 23 only can be formed on a region where is not covered by movement of the unloading unit 17 and the positioning unit 19, so that the holes 23 usually do not align with electronic components of the main board 22, and the electronic components of the main board 22 are not overhauled conveniently. Furthermore, a distance between the base 18 and the main board 22 is predetermined for disposing the electronic components with large dimensions, which is unfavorable to thin design of the slot-in optical disk drive 10. Besides, heat generated by the electronic components of the main board 22 arises working temperature of the slot-in optical disk drive 10. Because the base 18 covers the main board 22, the holes 23 on the base 18 can not dissipate the heat effectively, so that the heat not only reduces service life of the electronic components, but also affects operation of the slot-in optical disk drive 10. Thus, design of the loading/unloading mechanism of the slot-in optical disk drive is an important issue in the notebook computer industry.

SUMMARY OF THE INVENTION

An objective of the invention is to provide a slot-in optical disk drive for solving above drawbacks. The slot-in optical disk drive disposed a right positioning bar and a left positioning bar on two sides of a unloading bar, so as to decrease moving ranges of the right positioning bar and the left positioning bar to balance force distribution of a loading bar for guiding an optical disk.

Another objective of the claimed invention is to provide the slot-in optical disk drive including a breach on the base. The breach does not cover the working ranges of the left positioning bar, the right positioning bar, and the unloading unit for disposing the electronic components with large dimensions, high working temperature and frequent inspection. The breach on the base not only can decrease height of the slot-in optical disk drive which allows easy inspection, but also can face the optical disk for decreasing the temperature of the slot-in optical disk drive by airflow.

In order to achieve the foregoing objectives of the claimed invention, the main board is disposed on a rear end of the casing of the slot-in optical disk drive. A power unit of the slot-in optical disk drive drives a sliding component, and a driving bar of the loading unit is driven by the sliding component for rotating a loading bar. A plurality of slots and two holes are formed on the base. A first linking bar of the unloading unit is pivoted to a center of the base. An end of the first linking bar having a haul slot is driven by the sliding component for driving a contact plank of the right positioning bar, and the other end of the first linking bar drives a second linking bar pivoted to the base. The second linking bar is fixed on an end of a recovering spring for driving the unloading bar pivoted to the base. A cam is formed on end of the unloading bar for driving the left positioning bar, and a contact end is formed on the other end of the unloading bar passing through the base. A contact wall protrudes from an end of the left positioning bar. The contact wall is constrained by a positioning spring so that the left positioning bar keeps a position nearby the lateral side of the casing.

According to the claimed invention, the power unit powers a driving motor to drive a gear set for driving the sliding component. An actuating component is disposed on the second linking bar for actuating a detecting switch of the main board so as to actuate the driving motor. The main board further includes a limit switch, which is actuated by the sliding component for shooting down the driving motor, so as to stop a movement of the sliding component. A breach is formed on the base adjacent to the central rear end of the casing, and is located at the center of the first linking bar. The operating ranges of left positioning bar, the right positioning bar, and the first linking bar do not overlap the breach, the electronic components with large dimensions, high working temperature and frequent inspection can be disposed on the main board corresponding to the breach for designing a thin structure.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
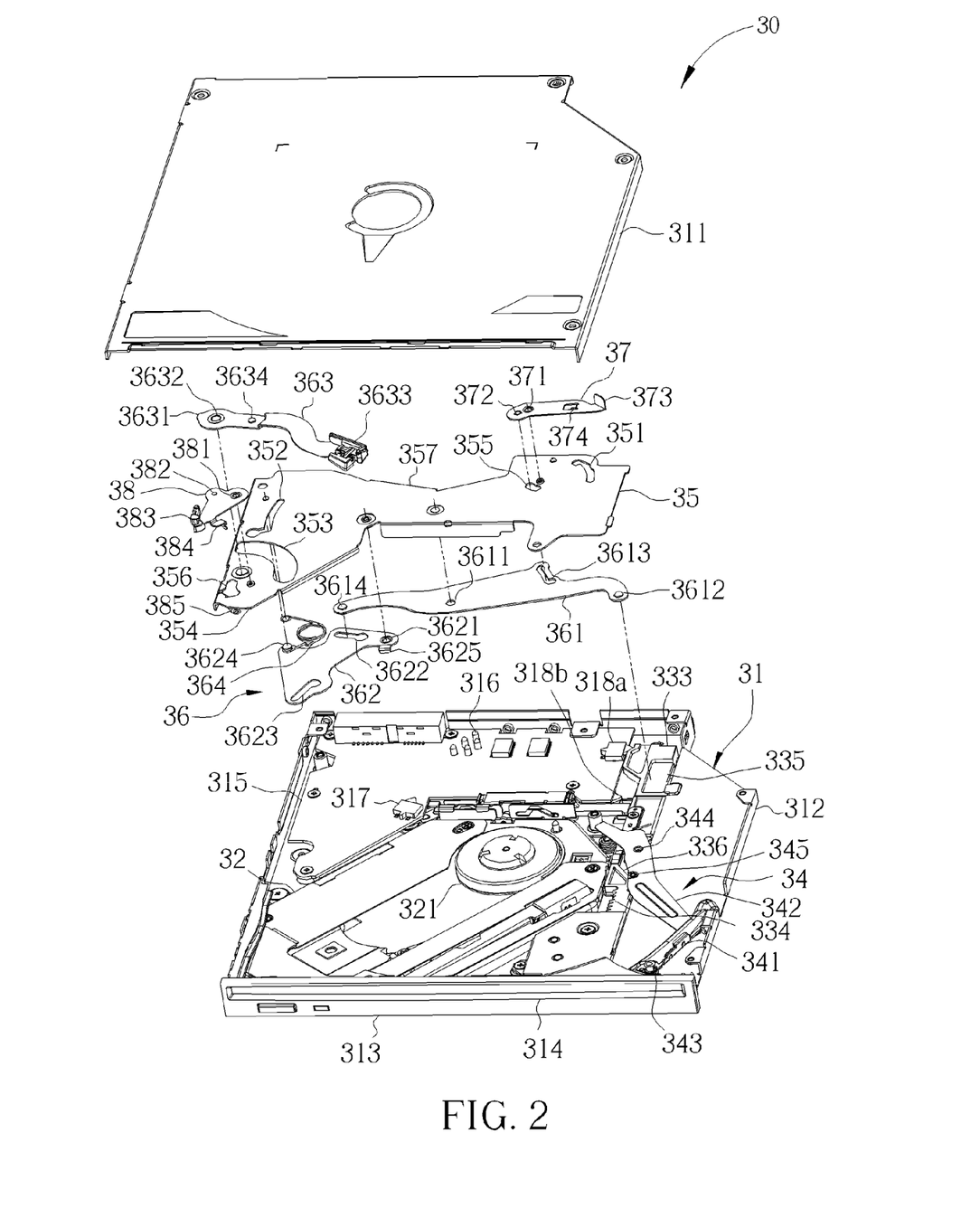
FIG. 2 is an exploded diagram of a slot-in optical disk drive according to a preferred embodiment of the present invention.
Figure 3:
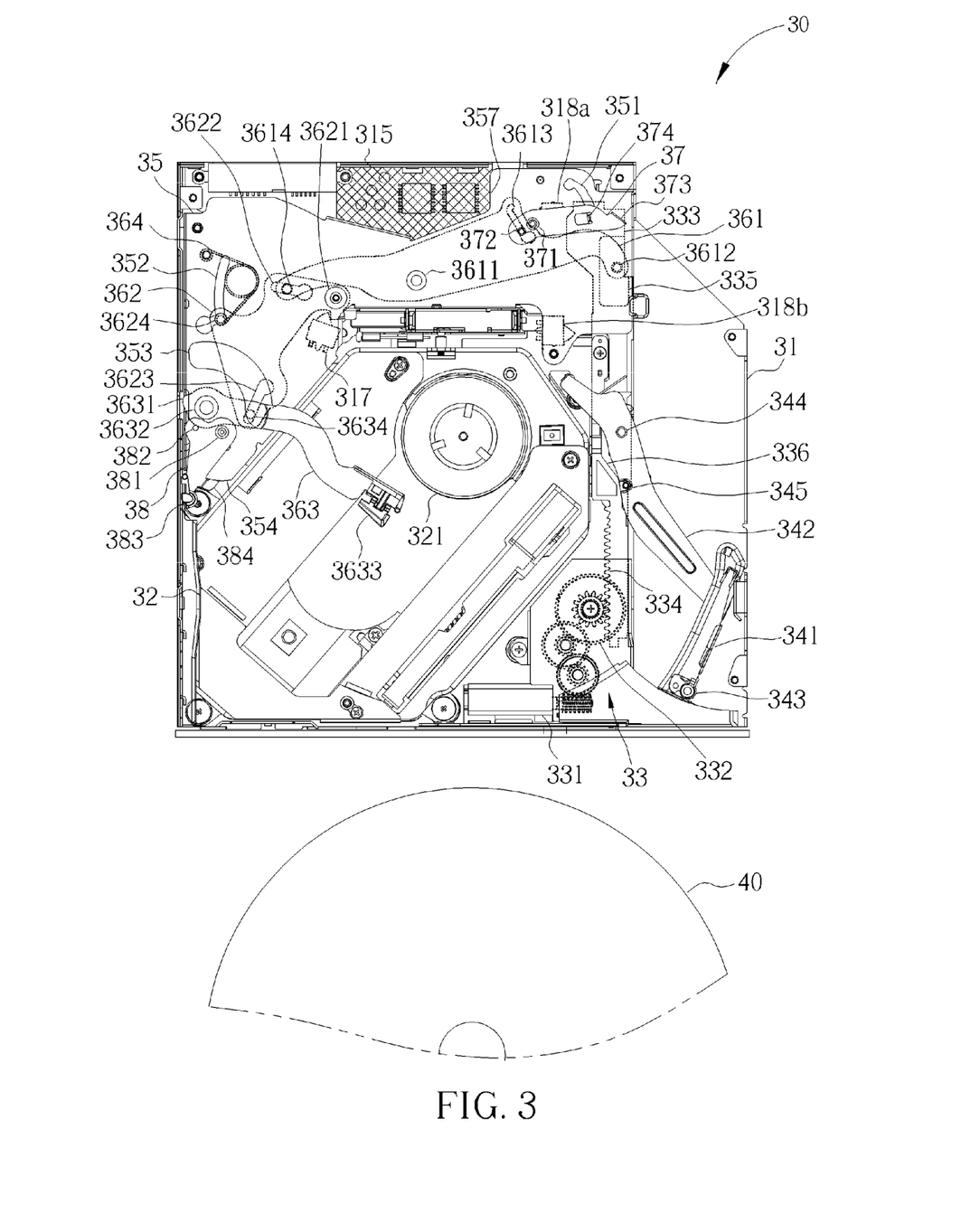
FIG. 3 is a top view of the slot-in optical disk drive according to the preferred embodiment of the present invention.

Please refer to FIG. 2 and FIG. 3. FIG. 2 is an exploded diagram of components of a slot-in optical disk drive 30 according to a preferred embodiment of the present invention. FIG. 3 is a top view of the slot-in optical disk drive 30 according to the preferred embodiment of the present invention. The slot-in optical disk drive 30 includes a casing 31, a traverse 32, a power unit 33, a loading unit 34, a base 35, an unloading unit 36, a right positioning bar 37, and a left positioning bar 38. The casing 31 includes an upper housing 311 and a low housing 312, and a hollow space is formed between the upper housing 311 and the low housing 312. A panel 313 is disposed on a front end of the casing 31, and an opening 314 is formed on the panel 313 for loading/unloading an optical disk 40. A main board 315 is disposed on a rear end of the casing 31, and electronic components 316, a detecting switch 317, and limit switches 318a, 318b are disposed on the main board 315. An end of the traverse 32 is pivoted to the front end of the casing 31, and a spindle motor 321 is disposed on the other end of the traverse 32 for rotating the optical disk 40. The traverse 32 inclines from a corner of the casing 31 to a center of the casing 31.

The power unit 33 is disposed on a lateral side of the traverse 32 for providing electrical power to the slot-in optical disk drive 30. The driving motor 331 disposed on the front end of the slot-in optical disk drive 30 rotates the gear set 332 to drive a rack 334 disposed on a front end of the sliding component 333, so that the sliding component 333 slides along a lateral side of the casing 31. The limit switches 318a, 318b are adjacent to a rear end of the sliding component 333 for controlling the movement of the sliding component 333. A first driving slot 335 and a second driving slot 336 are formed on the sliding component 333. The loading unit 34 includes a loading bar 341 and a driving bar 342 disposed on the lateral side of the casing 31 and located on the same side with the power unit 33. An end of the loading bar 341 is pivoted to the side of the casing 31 adjacent to the opening 314, and the other end of the loading bar 341, whereon a contact pin 343 is disposed, stretches toward the opening 314. An end of the driving bar 342 is connected to the loading bar 341, and a center of the driving bar 342 is pivoted to the casing 31 via a pivot 344. A first sliding pin 345 installed on the driving bar 342 is inserted into the second driving slot 336 and is driven by the sliding component 333 for rotating the loading bar 341 in an angle.

The base 35 is disposed on the rear end of the casing 31 and covers the main board 315. A first guiding slot 351, a second guiding slot 352, a third guiding slot 353, a guiding edge 354, a first passing hole 355, and a second passing hole 356 are formed on the base 35. A breach 357 is formed on the base 35 adjacent to a central rear end of the slot-in optical disk drive 30, as an inclined area shown in FIG. 3, and the area on the main board 315 facing to the breach 357 is not covered by the base 35 for disposing the electronic components 316 with large dimensions, high working temperature and frequent inspection. The unloading unit 36 includes a first linking bar 361, a second linking bar 362, an unloading bar 363, and a recovering spring 364. The first linking bar 361 is a long-striped component and is pivoted under the center of the base 35 and adjacent to the breach 357 via a first pivot 3611. A first guiding pin 3612 disposed on an end of the first linking bar 361 inserts into the first driving slot 335 of the sliding component 333. The first linking bar 361 is driven by the sliding component 333 to rotate around the first pivot 3611. A first haul slot 3613 is formed on the end of the first linking bar 361, as the same end as the first guiding pin 3612 is located. A second guiding pin 3614 disposed on the other end of the first linking bar 361 stretches toward the unloading bar 363 disposed on another side of the casing 31 whereon the unloading bar 363 is disposed. The unloading bar 363 is located opposite to the sliding component 333 inside the casing 31. The second linking bar 362 is a slice-shaped structure, and is disposed close to the unloading bar 363 and pivoted under the base 35 via a second pivot 3621. A second haul slot 3622, a third haul slot 3623, and a third guiding pin 3624 are formed on the second linking bar 362. The second guiding pin 3614 of the first linking bar 361 is inserted into the second haul slot 3622, so that the second linking bar 362 rotates around the second pivot 3621, and the third guiding pin 3624 fixed on an end of the recovering spring 364 is inserted into the second guiding slot 352 so as to compress or release the recovering spring 364 installed on the base 35. An actuating component 3625 is disposed on the second linking bar 362 for actuating the detecting switch 317.

A cam 3631 is formed on an end of the unloading bar 363, and the unloading bar 363 is pivoted under the base 35 via a third pivot 3632. A contact end 3633 is formed on the other end of the unloading bar 363 passing through the third guiding slot 353. A fourth guiding pin 3634 formed on a center of the unloading bar 363 is inserted into the third haul slot 3623 for being driven by the second linking bar 362 to rotate around the third pivot 3632 along the third guiding slot 353. The recovering spring 364 provides a resilient force to recover the unloading unit 36 to an initial status of the slot-in optical disk drive 30. That is to say, the recovering spring 364 pushes the contact end 3633 of the unloading bar 363 nearby the spindle motor 321 for ejecting the optical disk 40 or waiting next operation.

The right positioning bar 37 can be a slice-shaped component. The right positioning bar 37 is pivoted to the base 35 via a fourth pivot 371. A fifth guiding pin 372 protrudes from an end of the right positioning bar 37 adjacent to the rear end of the sliding component 333. The fifth guiding pin 372 passes through the first passing hole 355 on the base 35 for being driven by the first haul slot 3613 of the first linking bar 361 under the base 35 to rotate the right positioning bar 37 around the fourth pivot 371. A contact plank 373 is disposed on the other end of the right positioning bar 37 for guiding the optical disk 40. A guide plank 374 is disposed on the other end of the right positioning bar 37 close to the contact plank 373 for sliding along the first guiding slot 351 so as to support rotation of the right positioning bar 37.

The left positioning bar 38 can be a triangular slice-shaped component. A first end of the left positioning bar 38 is pivoted to the base 35 via a fifth pivot 381 and is close to the third pivot 3632 of the unloading bar 363. A sixth guiding pin 382 protrudes from a second end of the left positioning bar 38 and passes through the second passing hole 356 on the base 35 for being driven by the cam 3631 to rotate the left positioning bar 38 around the fifth pivot 381. A contact wall 383 is formed on the third end of the left positioning bar 38 for guiding the optical disk 40. A clip 384 is disposed on the third end of the left positioning bar 38 adjacent to the contact wall 383 for sliding along the guiding edge 354 on the base 35 so as to support rotation of the left positioning bar 38. An end of a positioning spring 385 is fixed under the base 35, and the other end of the positioning spring 385 is connected to the clip 384, so that the left positioning bar 38 keeps a position nearby the lateral side of the slot-in optical disk drive 30.

Figure 4:
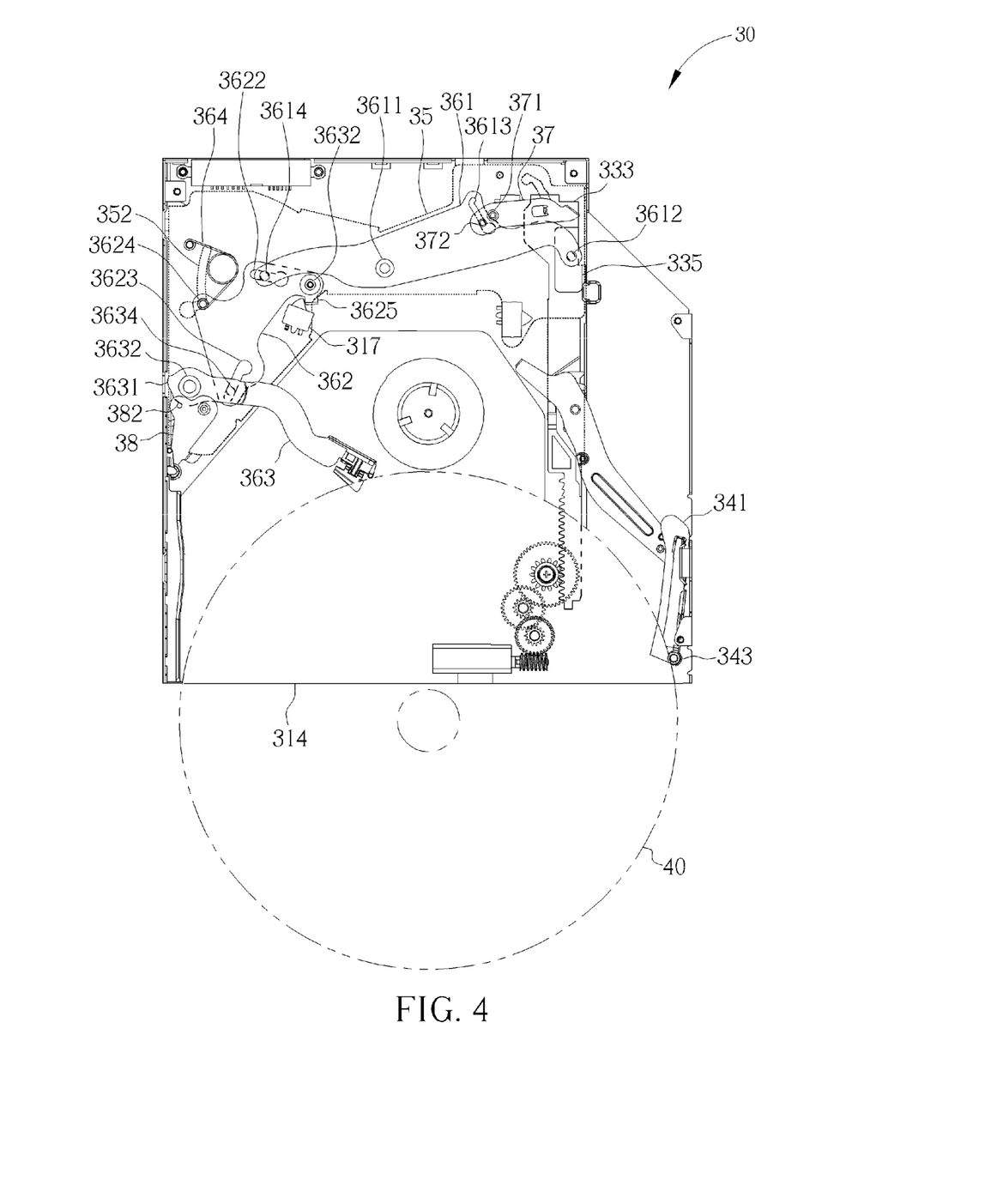
FIG. 4 to FIG. 7 are diagrams illustrating loading procedure of an optical disk with the slot-in optical disk drive according to the preferred embodiment of the present invention.

Please refer to FIG. 4, FIG. 5, FIG. 6, and FIG. 7. FIG. 4 to FIG. 7 are diagrams illustrating loading procedures of an optical disk 40 with the slot-in optical disk drive 30 according to the preferred embodiment of the present invention. As shown in FIG. 4, the optical disk 40 has been inserted into the opening 314 on the slot-in optical disk drive 30. The optical disk 40 laterally pushes the contact pin 343 of the loading bar 341 and then pushes the unloading bar 363. The unloading bar 363 rotates backward around the third pivot 3632, and the cam 3631 does not contact the sixth guiding pin 382 of the left positioning bar 38, which means the left positioning bar 38 keeps the position on the lateral side of the slot-in optical disk drive 30. The unloading bar 363 pushes the second linking bar 362 to drive the third guiding pin 3624 to move along the second guiding slot 352 via the fourth guiding pin 3634 inserted into the third haul slot 3623, and the recovering spring 364 disposed on the base 35 is compressed simultaneously, so that the second linking bar 362 rotates around the third pivot 3632 for moving the actuating component 3625 nearby the detecting switch 317, as the slot-in optical disk drive 30 is not powered yet. At the same time, the second haul slot 3622 drives the second guiding pin 3614 to rotate the first linking bar 361 around the first pivot 3611, so as to drive the first haul slot 3613 and the first guiding pin 3612. The first haul slot 3613 drives the fifth guiding pin 372 to rotate the right positioning bar 37 around the fourth pivot 371. The first guiding pin 3612 can not contact the end of the first driving slot 335 due to the large first driving slot 335 of the sliding component 333, which means the first guiding pin 3612 can move freely without constraint of the sliding component 333.

Figure 5:
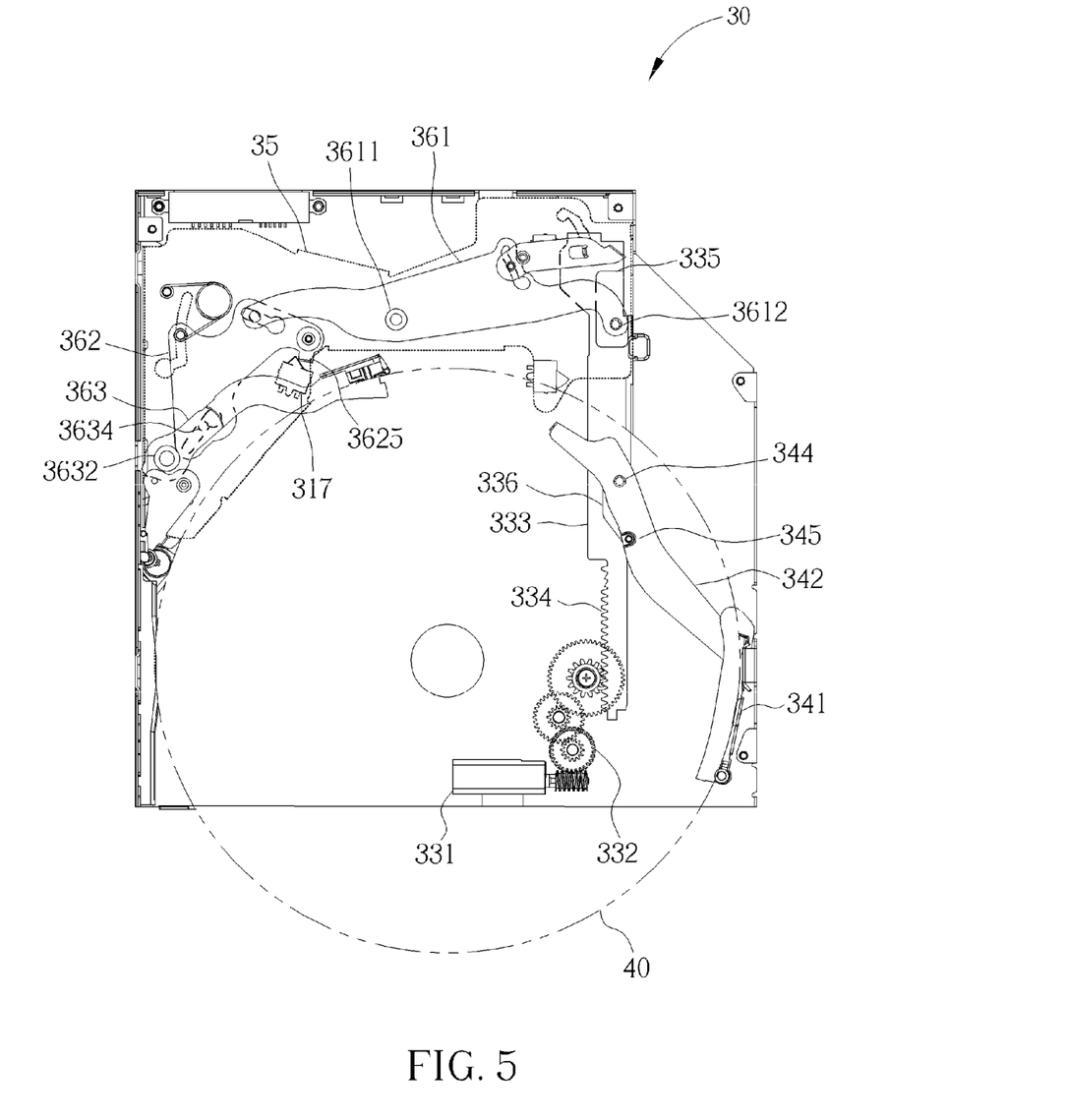

As shown in FIG. 5, the optical disk 40 pushes the unloading bar 363 as the optical disk 40 continues inserting into the slot-in optical disk drive 30. The unloading bar 363 utilizes the fourth guiding pin 3634 to push the second linking bar 362. The actuating component 3625 of the second linking bar 362 can actuate the detecting switch 317 to actuate the driving motor 331 of the slot-in optical disk drive 30. The driving motor 331 rotates the gear set 332 to drive the rack 334 for moving the sliding component 333. When the sliding component 333 moves, the second driving slot 336 drives the driving bar 342 to rotate around the pivot 344 via the first sliding pin 345, so as to drive the contact pin 343 of the loading bar 341 to push the optical disk 40 into the slot-in optical disk drive 30. Meanwhile, the first driving slot 335 drives the first guiding pin 3612 to rotate the first linking bar 361 around the first pivot 3611. Then the second linking bar 362 drives the unloading bar 363 to rotate backward around the third pivot 3632, so that the slot-in optical disk drive 30 loads the optical disk 40 automatically.

Figure 6:
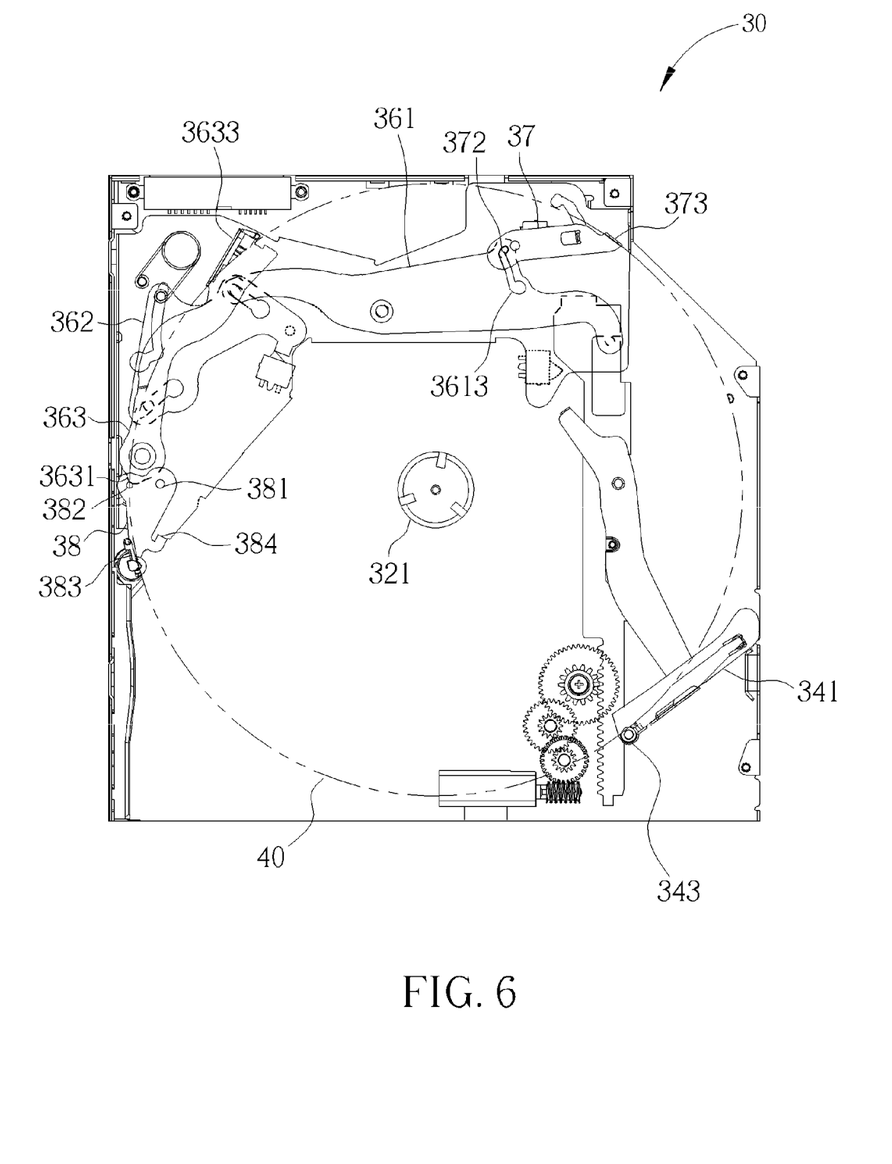

As shown in FIG. 6, when the loading bar 341 is positioning the optical disk 40, the optical disk 40 pushes the contact end 3633 of the unloading bar 363 and contacts the contact plank 373 of the right positioning bar 37 simultaneously. Because the fifth guiding pin 372 of the right positioning bar 37 is driven by the first haul slot 3613 of the first linking bar 361, and the first linking bar 361 is pushed by the unloading bar 363 via the second linking bar 362, the contact end 3633 of the unloading bar 363 and the contact plank 373 of the right positioning bar 37 respectively contact two points of the optical disk 40 to guide the central hole on the optical disk 40 to the predetermined position. However, the contact pin 343 of the loading bar 341 can not have balanced force distribution with the contact end 3633 of the unloading bar 363 and the contact plank 373 of the right positioning bar 37. Thus, when the optical disk closes to the predetermined position, the cam 3631 of the unloading bar 363 pushes the sixth guiding pin 382 of the left positioning bar 38 to rotate the left positioning bar 38 around the fifth pivot 381, so that the clip 384 and the positioning spring 385 (as shown in FIG. 2) drives the contact wall 383 to push the optical disk 40. Therefore, the central hole of the optical disk 40 can engage with the spindle motor 321 by a triangular positioning method.

Figure 7:
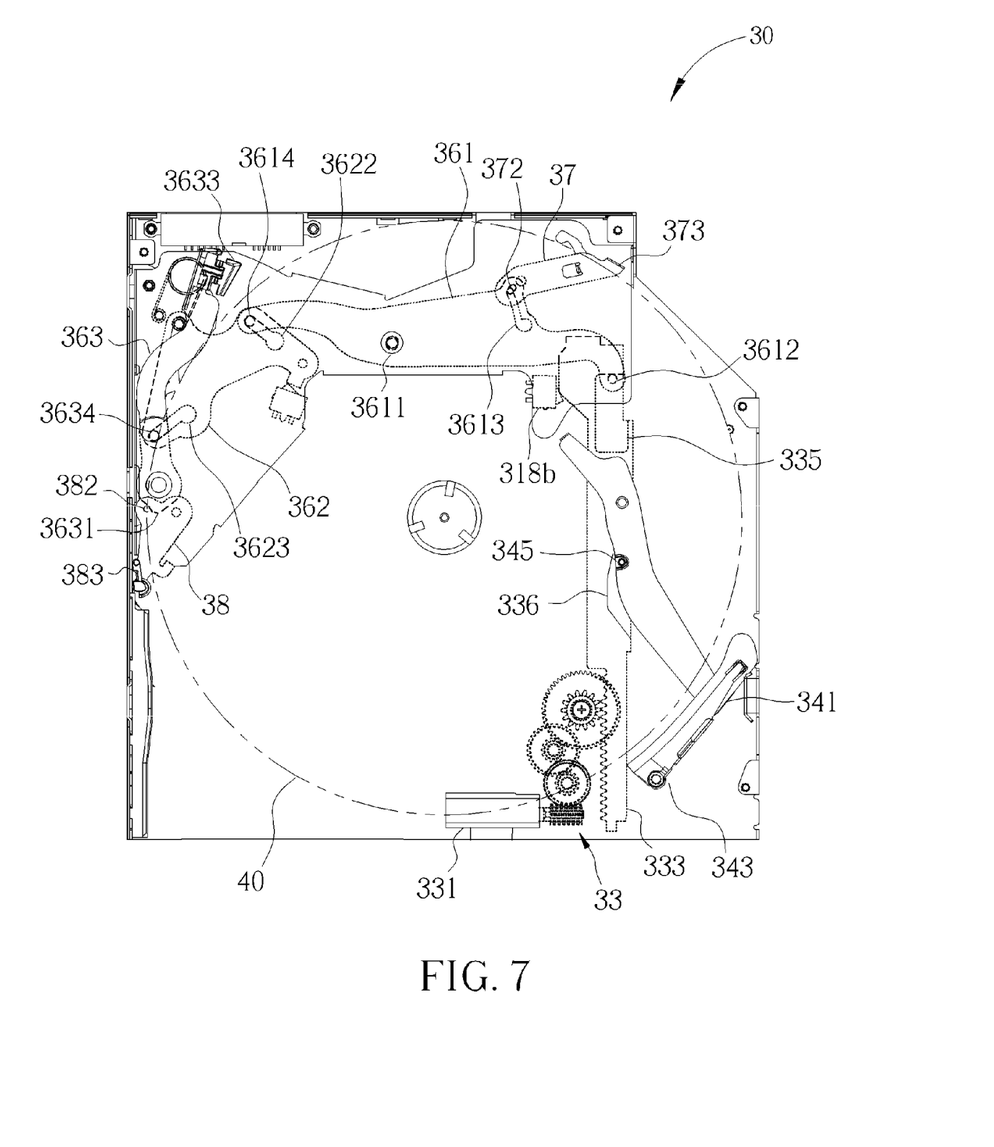

As shown in FIG. 7, the power unit 33 drives the sliding component 333 continuously, so that the second driving slot 336 drives the first sliding pin 345 to separate the contact pin 343 of the loading bar 341 from the optical disk 40. Then, the first driving slot 335 pushes the first guiding pin 3612 to rotate the first linking bar 361 around the first pivot 3611, so as to utilize the first haul slot 3613 to drive the right positioning bar 37 via the fifth guiding pin 372 and to separate the contact plank 373 from the optical disk 40. Meanwhile, the second guiding pin 3614 of the first linking bar 361 drives the second linking bar 362 via the second haul slot 3622, and the second linking bar 362 pushes the fourth guiding pin 3634 via the third haul slot 3623, so as to rotate the unloading bar 363 to separate the contact end 3633 from the edge of the optical disk 40. In addition, the cam 3631 of the unloading bar 363 separates from the sixth guiding pin 382. The positioning spring 385 (as shown in FIG. 2) pulls the contact wall 383 of the left positioning bar 38 away from the edge of the optical disk 40, and the sliding component 333 actuates the limit switch 318b to stop the loading operation driven by the driving motor 331 simultaneously.

As shown in FIG. 4, FIG. 5, FIG. 6, and FIG. 7, unloading procedure of the slot-in optical disk drive 30 is inverse to the loading procedure as above mentioned. That is to say, the power unit 33 moves the sliding component 333 backward, the resilient force of the recovering spring 364 pushes the second linking bar 362 to rotate the unloading bar 363, and the sliding component 333 releases the first guiding pin 3612 of the first linking bar 361 for ejecting the optical disk 40 until the unloading bar 363 moves to an initial position of the loading procedure, so that the sliding component 333 actuates the limit switch 318a to stop the unloading operation of the slot-in optical disk drive 30.

Compared with the prior art, the slot-in optical disk drive of the present invention utilizes the left positioning bar and the right positioning bar respectively disposed on the two sides of the unloading bar to distribute the balanced force on the optical disk with the loading bar, so as to align the central hole on the optical disk with the spindle motor. In addition, the first linking bar pivoted under the base does not drive the left positioning bar, the right positioning bar, and the unloading unit to move in the area facing to the breach on the base, so that the electronic components with large dimensions, high working temperature and frequent inspection can be disposed on the area on the main board facing to the breach, so as to simplify the structural design and to reduce height of the slot-in optical disk drive. Therefore, inspection of the slot-in optical disk drive is convenient due to disposition of the electronic components corresponding to the breach. Additionally, the breach, which faces airflow generated by the rotating optical disk, is helpful to cool the electronic components with high working temperature.

Those skilled in the art will readily observe that numerous modifications and alterations of the device and method may be made while retaining the teachings of the invention.

What is claimed is:

1. A slot-in optical disk drive comprising:
   a casing, an opening being formed on a front end of the casing, and a main board being disposed on a rear end of the casing;
   a power unit disposed on the front end of the casing for driving a sliding component to move forward and backward along a lateral side of the casing, a first driving slot and a second driving slot being formed on the sliding component;
   a loading unit disposed on a lateral side of the casing adjacent to the opening, the loading unit comprising:
      a loading bar, an end of the loading bar being pivoted to the casing; and
      a driving bar driven by the second driving slot for rotating the loading bar;
   a base covering the main board on the casing, a first guiding slot, a second guiding slot, a third guiding slot, a first passing hole, and a second passing hole being formed on the base;
   a unloading unit disposed on the base, the unloading unit comprising:
      a first linking bar, a center of the first linking bar being pivoted under the base, a first guiding pin being disposed on an end of the first linking bar and inserted into the first driving slot for being driven by the sliding component, a first haul slot being formed on the same end of the first linking bar, and a second guiding pin being disposed on the other end of the first linking bar;
      a recovering spring, an end of the recovering spring being fixed on the base;
      a second linking bar pivoted under the base, a second haul slot and a third haul slot being formed on the second linking bar, the second guiding pin being inserted into and driven by the second haul slot, and a third pin being disposed on the second linking bar, fixed on the other end of the recovering spring, and inserted into the second guiding slot; and
      a unloading bar disposed on a lateral side of the casing opposite to the sliding component, a cam being formed on an end of the unloading bar and pivoted under the base via a pivot, a contact end being formed on the other end of the unloading bar for passing through the third guiding slot and above the base, and a fourth guiding pin being disposed on a center of the unloading bar and inserted into the third haul slot for being driven by the second linking bar;
   a right positioning bar pivoted to the base adjacent to the rear end of the sliding component, a fifth guiding pin being disposed on an end of the right positioning bar, passing through the first passing hole, and inserting into the first haul slot for being driven by the first linking bar, a contact plank being formed on the other end of the right positioning bar, and a guide plank being disposed on the other side of the right positioning bar adjacent to the contact plank for inserting into the first guiding slot; and
   a left positioning bar, a first end of the left positioning bar being pivoted to the base and adjacent to the pivot of the unloading bar, a sixth guiding pin being disposed on a second end of the left positioning bar and passing through the second passing hole for being driven by the cam, a contact wall protruding from a third end of the left positioning bar and being constrained by a positioning spring so that the left positioning bar keeps a position nearby the lateral side of the casing.

2. The slot-in optical disk drive of claim 1, wherein a breach is formed on the base adjacent to a central rear side of the casing and is located at a center of the first linking bar, and movement ranges of the right positioning bar, the left positioning bar, and the unloading unit do not pass the breach.

3. The slot-in optical disk drive of claim 1, wherein area of the main board uncovered by the base is for disposing electronic components with large dimensions, high working temperature and frequent inspection.

4. The slot-in optical disk drive of claim 1, wherein the power unit further comprises a driving motor and a gear set driven by the driving motor to move the sliding component.

5. The slot-in optical disk drive of claim 4, wherein a detect switch is disposed on the main board for actuating the driving motor.

6. The slot-in optical disk drive of claim 5, wherein the second linking bar comprises an actuating component for actuating the detect switch.

7. The slot-in optical disk drive of claim 1, wherein a limit switch is disposed on the main board for closing the driving motor to stop the movement of the sliding component when the sliding component actuates the limit switch.

8. The slot-in optical disk drive of claim 1, wherein a clip protrudes from the left positioning bar adjacent to the contact wall for moving along an edge of the base.

9. The slot-in optical disk drive of claim 8, wherein an end of the positioning spring is fixed on the base, and the other end of the positioning spring is connected to the clip.

10. The slot-in optical disk drive of claim 1, wherein the fifth guiding pin of the right positioning bar is driven by the first linking bar, and the first linking bar pushes the unloading bar via the second linking bar so that the right positioning bar and the unloading bar position an optical disk unitedly.

11. The slot-in optical disk drive of claim 10, wherein the cam pushes the sixth guiding pin of the left positioning bar to rotate the left position bar around a fifth pivot and to resist a resilient force of the positioning spring when the optical disk is positioned, so that the contact wall pushes the edge of the optical disk to guide the optical disk with the right positioning bar, the loading unit, and the unloading unit.

12. The slot-in optical disk drive of claim 11, wherein the positioning spring pushes the contact wall of the left positioning bar to the lateral side of the casing when the cam separates from the sixth guiding pin.

* * * * *